Figure 1:
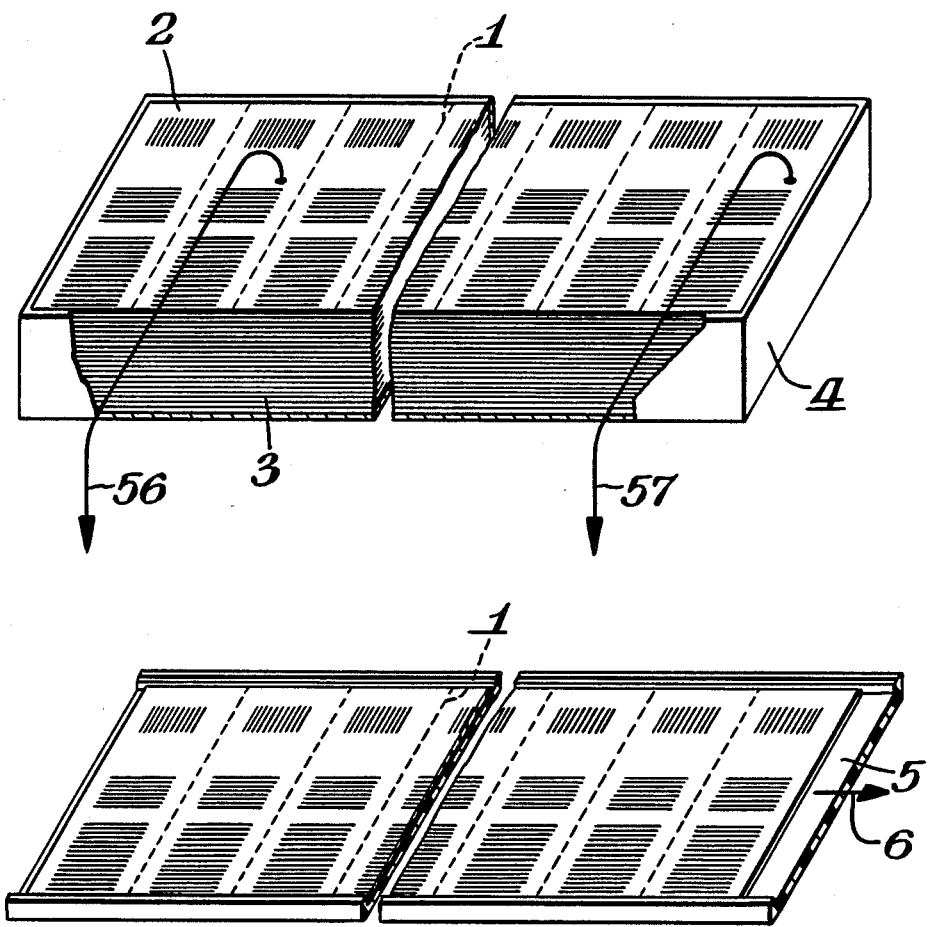

United States Patent [19]

Hoffacker et al.

[11] Patent Number: 4,867,815

[45] Date of Patent: Sep. 19, 1989

[54] PROCESS FOR THE MANUFACTURE OF FILM CARTRIDGES

[75] Inventors: Franz Hoffacker, Lagenfeld; Hermann Lührig, Leverkusen; Albert Maier, Taufkirchen, all of Fed. Rep. of Germany

[73] Assignee: Agfa-Gevaert Aktiengessellschaft, Leverkusen, Fed. Rep. of Germany

[21] Appl. No.: 104,178

[22] Filed: Oct. 5, 1987

[30] Foreign Application Priority Data

Oct. 16, 1986 [DE] Fed. Rep. of Germany ....... 3635214
May 1, 1987 [DE] Fed. Rep. of Germany ....... 3714601

[51] Int. Cl.$^4$ .............................................. B65B 7/28
[52] U.S. Cl. .................................... 156/69; 29/564.1; 156/215; 156/218; 156/272.4; 156/275.3; 156/277; 493/117; 493/287
[58] Field of Search ................ 354/275, 276; 430/500, 430/501, 496, 471; 206/389, 407–409, 455, 821; 229/93; 493/287, 116, 117; 156/69, 200, 203, 212, 213, 215, 217–218, 272.2, 272.4, 274.4, 274.6, 274.8, 275.1, 275.3, 277, 278, 322, 321, 552, 301, 302, 303; 29/561, 564, 564.1, 806, 33 P

[56] References Cited

U.S. PATENT DOCUMENTS 4,024,557 5/1977 Aoyama .............................. 354/275
4,106,420 8/1978 Takahashi ........................... 156/203

FOREIGN PATENT DOCUMENTS 3118210 2/1982 Fed. Rep. of Germany .

Primary Examiner—Merrell C. Cashion, Jr.
Attorney, Agent, or Firm—Connolly & Hutz

[57] ABSTRACT

In a process for the manufacture of film cartridges which have a substantially cyclindrical wall, a film opening extending along a generating line of the cylinder and caps at the ends, one plate per cartridge is separated from a flat strip of material to form the cartridge wall, which strip of material contains the plates for several cartridges and has a width corresponding to the circumference of a cartridge wall, and the said strip of material is fitted continuously with a sealing material along at least one of the edges for the film opening before the plates are separated, the said sealing material being delivered to the strip of material in the form of endless band of sealing strips which are bonded to the strip of material as they pass through a glueing station.

8 Claims, 4 Drawing Sheets

PROCESS FOR THE MANUFACTURE OF FILM CARTRIDGES

This invention relates to a process for the manufacture of film cartridges having a substantially cylindrical wall, a film opening extending along a generating line of the cylindrical wall and caps at the ends. Plates of material, each designed to form the wall of one cartridge, are separated from a flat strip material before being formed. Each strip is large enough for the walls of several cartridges and its width is equal to the circumference of a wall. Before the strip of material is separated into individual plates, a sealing material is continuously applied to the strip along at least one of the edges which are to form the film openings.

The invention relates to an apparatus for carrying out this process.

The manufacture of film cartridges by a process of the kind described above has already been disclosed in DE-A1-31 18 210. In the process disclosed in the said document, the sealing material is composed of individual fibres which are applied by flocking along the edges of the strip of material. It is impossible to apply the sealing material so that it projects slightly beyond the edges which are to form the film opening of the cartridge, as would frequently be desirable for the purpose of excluding light. It is therefore necessary to use caps which cover also the opening of the cartridge. The production of these caps are more expensive than the production of axially symmetric caps and require special means for their assemblage.

It is also known to use sealing strips of synthetic material which are cut from a continuous supply tape in pieces equal to the length of the film opening and then glued into the film opening of the cartridge. This is a labour-intensive and time-consuming process and does not always result in the sealing strips being accurately glued into the film opening.

It was therefore an object of the present invention to provide a process by which the film opening could be accurately lined with sealing strips of the correct dimensions and in the correct positions and which would be simple and inexpensive to carry out.

The invention solves this problem by the features of claim 1 of the appended Patent Claims. Other features of the invention will be apparent from the Patent Claims following Claim 1.

The invention enables film cartridges to be produced by a largely automated sequence of steps. The process according to the invention ensures a uniformly high quality of manufacture in spite of the increased output.

The manufacture of cartridges by the process according to the invention is also very inexpensive.

Figure 2:
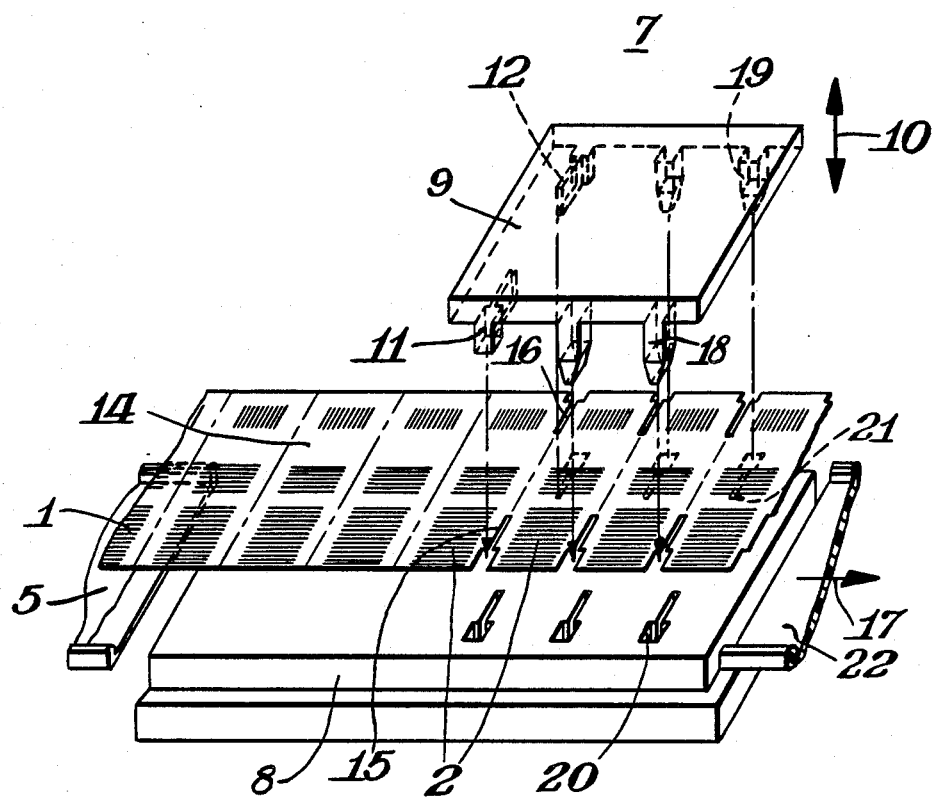
Figure 3:
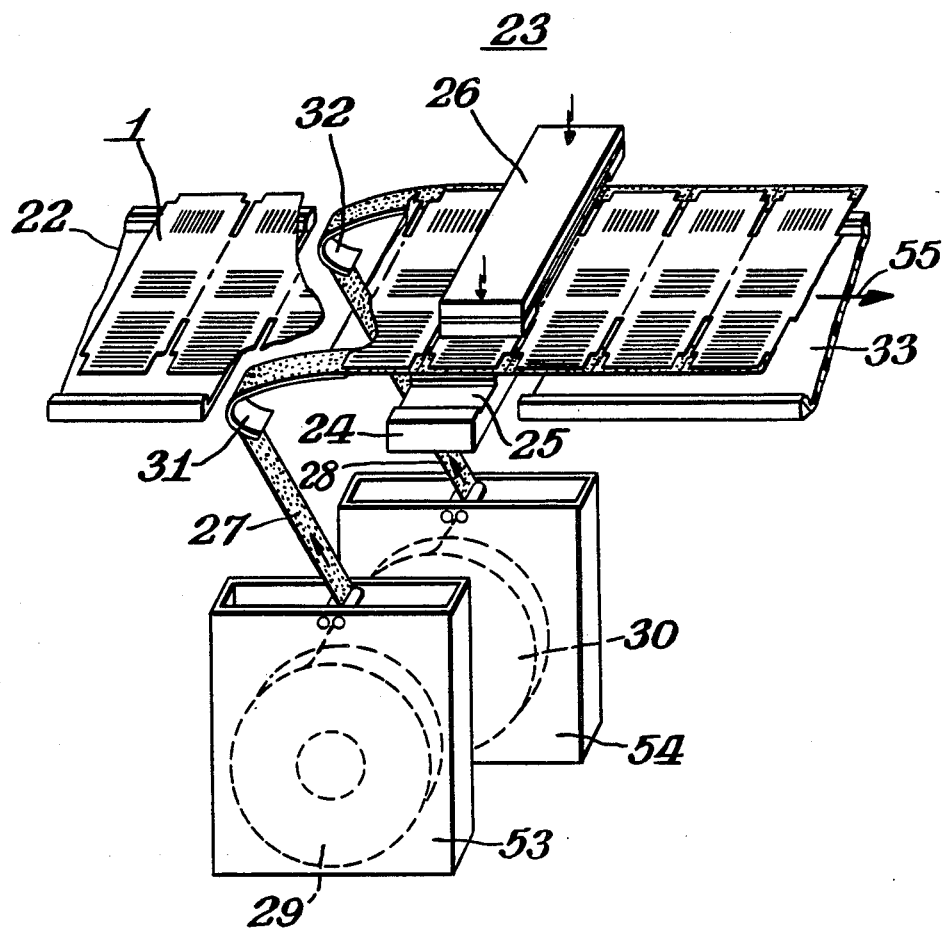
Figure 4:
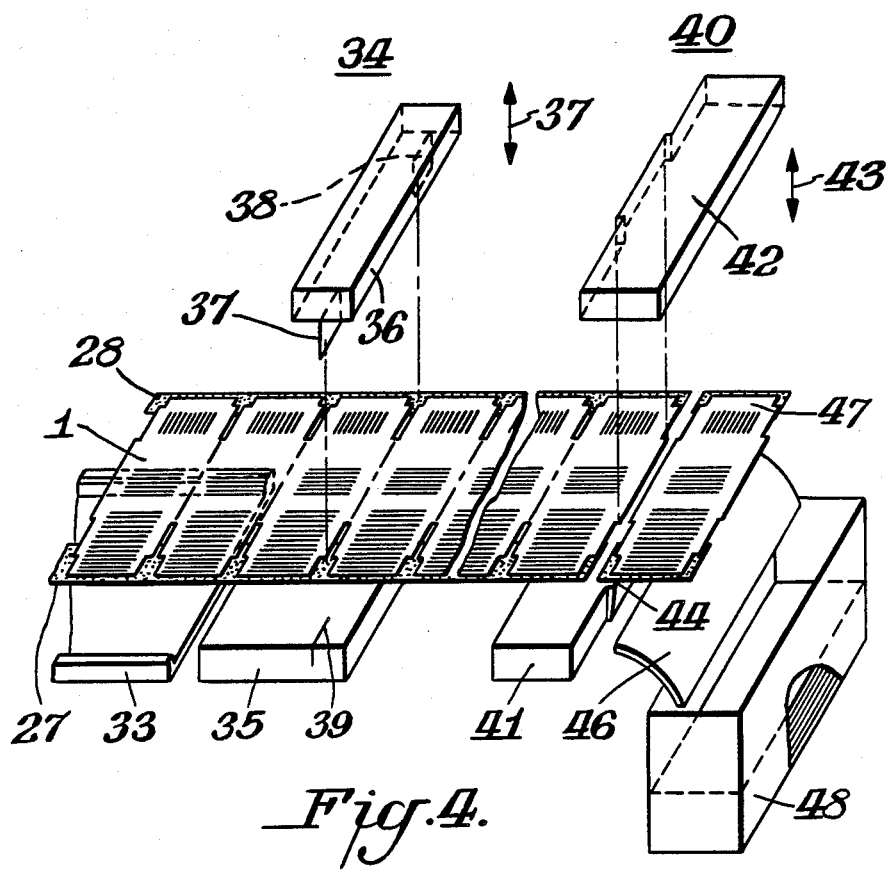
Figures 5, 6, 7, 8:
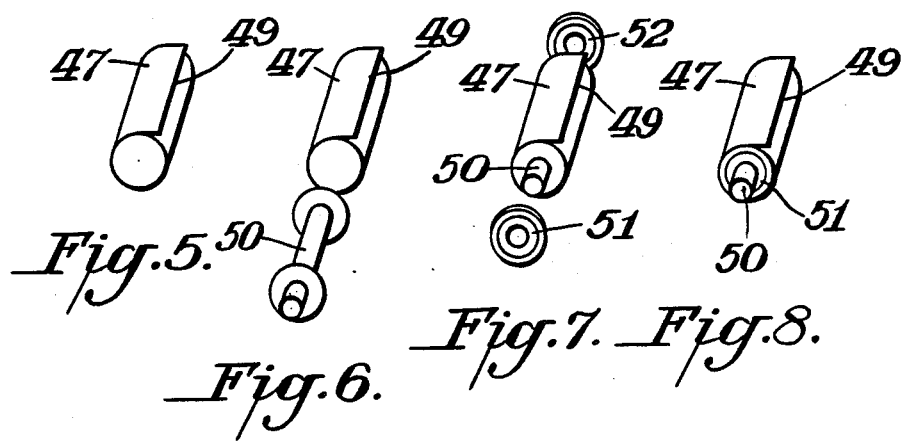

An exemplary embodiment of the invention is described below with reference to the attached drawings, in which FIG. 1 shows a station for separating the individual strips of material, FIG. 2 shows a station for punching out the notches for the caps, FIG. 3 shows a station for supplying the sealing strips and glueing them into position, FIG. 4 shows a cutting station for cutting up the sealing strips and separating the individual plates for the cartridges from the strips of material, FIG. 5 shows a cartridge wall formed from a cartridge plate, FIG. 6 shows the cartridge plate with a film spool before the insertion into the cartridge, FIG. 7 shows the cartridge with film spool inserted therein and two caps before they are placed on the cartridge, FIG. 8 shows the complete cartridge.

In the example described below, comparatively large metal sheets are used as starting material for producing the walls of the cartridge. These metal sheets are covered with numerous fields arranged in several rows and columns, the area of each field corresponding to the area of a cartridge wall before it is bent over. Each field is lacquered and carries printed matter according to the desired appearance of the cartridge which is to be formed from it, including particulars indentifying the film and the manufacturing company and other information. The fields may also contain codes of the DX system.

The metal sheets are cut up into individual strips of material marked by the reference numeral 1 in FIG. 1, each strip comprising a row of fields.

Each of these strips of material 1 contains several identical fields 2 placed side by side, each field containing the amount of material required for the wall of one cartridge. The strips of material 1 cut from the metal sheets are arranged as a stack 3 in a magazine 4 where they are kept for further processing.

The material strips 1 are then removed one by one from the stack 3 to travel through the various treatment stations shown in FIGS. 1 to 4 which are arranged one behind the other along a conveyor path.

After a full magazine 4 has been placed in the first of these treatment stations (FIG. 1), the uppermost strip of material 1 of the stack 3 in the magazine 4 is removed from the stack 3 by known suction devices (not shown) and then shifted sideways in the direction of the arrows 56, 57 to be lowered on to a guide rail 5 on which it is carried stepwise in the direction of the arrow 6 on known conveyor means to be transferred to the punching station 7 which is adjacent to the guide rail 5 in the direction of the arrow 6 and is shown in detail in FIG. 2.

The punching station 7 comprises a fixed matrix block 8 and a ram holder 9 in the form of a plate which is displaced in the direction of the double arrow 10 by drive means (not shown) so that it is moved down to the matrix block 8 to perform a punching stroke and returned at the end of the stroke. The ram holder 9 has two punches 11,12 whose cutting edges are T-shaped or anvil-shaped to conform to the shape of the matrixes 13,14 in the matrix block 8. When a ram holder 9 performs a punching stroke, the punches 11,12 move into the recesses of the matrixes 13,14 to cut out the notches 15,16 along the two edges of the strip of material 1 when the strip is inserted in the punching stations 7 between the matrix block 8 and the ram holder 9, these notches 15,16 being required for the subsequent attachment of the cartridge caps at the ends of the cartridges. During this punching operation, the strip of material 1 lies on the matrix block 8 but for reasons of clarity the support 5 and matrix block 8 on the one hand and the material strip 1 lying on the surfaces of the support and block are shown in exploded view in FIG. 2 so that they appear to be at some distance apart.

Before each punching stroke, the material strip 1 is positioned in the punching station so that the notches 15,16 for the caps will be formed exactly between two adjacent fields 2, i.e. between two adjacent sections of plates from which the cartridge walls are to be formed. When adjacent plate sections are subsequently separated along the line of symmetry of the cap notches, these notches form part of the peripheral contours of the plate sections.

The strip of material 1 is moved forwards by one field 2 in the direction of the arrows 6,17 between two successive punch strokes of the holder 9 by a conveyor device (not shown).

In addition to the rams 11,12 used as punching tools, the ram holder 9 carries two identical pairs of adjustment pins 18,19 which are longer in the direction of the downward movement of the ram holder 9 than the rams 11,12 and taper downwards. In the line of movement of the pair of adjustment pins 18,19, the matrix block 8 has additional matrix recesses 20,21 identical to the recesses 13,14 for the rams 11,12. The distance of the pins 18,19 from each other and from the adjacent rams 11,12 is always equal to the width of a field so that when the ram holder 9 moves down to perform a punching stroke, the wedge-shaped edges of the pins 18,19 pass through the notches 15,16 which have been produced in the previous punching stroke and which have meanwhile been moved forwards into the position of the pins 18,19 by the forward feed of the strip of material 1. As a result, the strip of material 1 becomes accurately positioned for the next punching stroke and the new cap notches produced will have the same distance from the notches produced in the previous stroke. If the amount by which the strip of material 1 is moved forwards between two punching strokes deviates slightly from the prescribed length, the adjustment pins 18,19 moving with their wedge-shaped edges into the notches formed in the previous stroke ensure that the strip of material 1 will be accurately positioned in exact registration before the rams 11,12 reach the upper surface of the strip of material 1 as the ram holder 9 descends. Inaccuracies in the stepwise forward movement of the strip of material are thereby corrected.

The strip of material 1 is transferred on the guide rail 22 from the punching station 7 (FIG. 2) to the glueing station 23 (FIG. 3). Glueing station 23 comprises a support 24 with grooves 25 at the edges and a pressure block 26. It also has two storage magazines 53,54 for sealing strips 27,28 in the form of "endless" tapes which are drawn off supply rolls 29,30 in the magazine and pass over fixed, curved runners 31,32 to reach the edges of the strip of material 1 from below in a tangential direction.

In the glueing station 23, the strip of material 1 is discontinuously drawn between the support 24 and the pressure block 26, the material lying on the support 24 and being pressed against it by the pressure block 26 which is covered with a soft lining to prevent scratching of the strip of material. As the strip of material is pressed down on the support 24, the sealing strips 27,28 which run along the grooves 25 of the support 24 are pressed against the underside of the strip of material 1 along its edges. The sealing strips 27,28 are delivered to the underside of the strip 1 in such a position that the edges of the strips 27,28 slightly project over the edges of the strip of material 1.

The sealing strips 27,28, usually of velvet, are coated on the underside with a usual hot melt glue. For the sealing, the pressure block 26 is equipped with a known electric heating device (not shown) by which the edges of the strip of material 1 which consists of a metal sheet is heated inductively from above. By the contact with the heated edges of the strip of material 1 the hot melt glue is molten so that the sealing strips 27,28 are bonded to the underside of the strip of material 1 and remain bonded thereto after cooling.

As the sealing strips 27,28 are delivered as endless strips, they bridge across the cap notches 15,16 on the underside of the strip 1, as shown in FIG. 3.

For the sake of clarity FIG. 3 shows the guide rails 22,33, the support 24 and the pressure block 26 in exploded view in relation to the strip of material 1 although in fact the strip of material 1 moves on the guide rails 22,33 and on the support 24.

On leaving the glueing station 23, the strip of material 1 is moved forwards on the guide rails 33 in the direction of the arrow 55 to reach the separating stations 34,40, which are again shown in exploded view in FIG. 4.

Along the path of transport of the strip of material 1, the guide rail 33 is followed by the separating station 34 for the sealing strips. This station comprises a matrix block 35 which supports the strip of material 1 from below as it moves forwards through the station 34 and a blade block 36 which can be moved down to the matrix block 35 and raised from it in the direction of the double arrow 37 by means of a driving device (not shown). The blade block 36 carries on its underside a pair of blades 37,38 which dip into narrow slots 39 in the matrix block 35 when the blade block 36 moves down to the matrix block 35.

Before the blade block 36 executes a working stroke, the strip of material 1 is so positioned over the matrix block 35 by the feed device (not shown) that the lines of symmetry of the cap notches 15,16 lie over the slots 39. As a result, when the blade block 36 subsequently moves down, the portions of sealing strips 27,28 which bridge across the cap notches 15,16 on the underside of the strip of material 1 are cut through by the blades 37,38 on the exact line of symmetry of these notches as the blades 37,38 move down through the notches 15,16.

The strip of material 1 is then moved forwards from the separating station 34 for the sealing strips to the cutting and separating station 40. This consists of the matrix block 41 which supports the strip of material 1 from below and the cutting tool 42 which can be moved down to the matrix block 41 and raised from it in the direction of the double arrow 43 by a drive (not shown). The matrix block 41 and cutting tool 42 have corresponding shearing edges 44,45.

Before the cutting tool 42 moves down to execute a working stroke, the strip of material 1 is positioned over the matrix block 41 so that the left edge of the last field 47 at the righthand end of the strip of material 1 lies over the shearing edge 44. This means that when the cutting tool 42 moves down, the last field 47 at the righthand end is separated from the strip of material. The cut section 47 constitutes the plate from which the cartridge wall will subsequently be formed.

As the fields 47 successively forming the last field at the righthand end of the strip of material are cut off by successive working strokes of the cutting tool 42, they drop as plates for the cartridge walls over a chute 46 into a storage box 48 in which the successively arising plates 47 are temporarily stored for further use.

Each plate 47 is substantially rectangular and its length is equal to the circumference of the cartridge wall subsequently formed while its width is equal to the axial length of the cartridge wall. In fact, the form of the plates 47 deviates slightly from the rectangular in that the edges have contours formed by the halves of the cap notches 15,16. The broad sides of the plates have sections of sealing strips on their undersurface, these strips projecting slightly beyond the peripheral edge of the plate on two sides.

To complete the formation of the cartridge wall and form the whole cartridge, the plates 47 stored in the box 48 are conveyed to other operating stations which do not form part of the present invention and have therefore not been illustrated.

To form the cartridges, each of the plates 47 temporarily stored in the storage box 48 is bent to form a cylindrical cartridge wall as shown in FIG. 5, the edge along one end extending tangentially while the other edge is bent over through more than 90°. The two edges of the plate 47, each of which carries a section of sealing strip 27,28, face each other after formation of the cylindrical cartridge wall and form the film opening 49. The sealing strips along the two edges of the plate 47 are placed in surface contact with each other to prevent the entry of light into the film opening 49 through which the film strip (not shown) inserted in the cartridge is subsequently pulled out.

Each cartridge wall is subsequently equipped with a separately produced film spool 50 (see FIG. 6) and axially symmetrical end caps 51,52 are subsequently placed on the ends of the wall (see FIG. 7). The complete cartridge is shown in FIG. 8.

The outer edges of these end caps 51,52 are beaded and fit tightly over the edges of the cartridge wall 47. The axially symmetrical formation of the caps 51,52 is possible because the cap notches 15,16 cause the edges at the ends of the cartridge wall 47 to spring back slightly in the region of the film opening 49 to receive the bent over edge of the caps 51,52 in the region of the opening 49. The light-tightness of the cartridge in this area is nevertheless preserved since the sealing strips 27,28 project slightly over these cut-back portions, as shown in FIGS. 3 and 4.

The invention is not limited to the embodiment described above by way of example. Instead of using containers 4,48 for temporary storage, the process may be carried out without storage. Furthermore, endless bands in the form of rolls may be used instead of strips of material 1 of finite length. Instead of applying sealing strips 27,28 to both edges of the strip of material 1, a strip may be applied to one edge only while the other edge is prepared by some other means to form a light-proof film opening 49 in the cartridge. The station 34 for separating the sealing strips and the station 40 for separating the plates 47 from the strip of material 1 may be combined in that the tools for cutting through the sealing strips 27,28 and the tools for separating the plates 47 may be arranged along a common line of cut.

Instead of producing one pair of notches, providing sealing strips to one strip of material 1, cutting the sealing strips for one strip of material 1 and cutting off one strip of material 1 in one step it is possible to produce more, e.g. two or four pairs of notches, etc. in one step by correspond multiple tools.

The example disclosed here applies to the manufacture of a cartridge for films of different formates as desired.

We claim:

1. Process for the manufacture of film cartridges, each cartridge comprising a substantially cylindrical cartridge wall, a film opening extending along a line on the cartridge wall parallel to the cartridge axis, and caps at the ends of said cartridge wall, said process comprising the steps of:
    (a) providing a strip material (1) containing plates for several cartridges, said strip of material having longitudinal edges and a width corresponding to the circumference of the cylindrical cartridge wall,
    (b) punching cap notches (15,16) along the longitudinal edges of said strip of material (1) at distances corresponding to the axial length of the cartridge wall to be formed,
    (c) continuously covering the strip of material (1) at least along one edge with at least one sealing material in the form of continuous sealing strip (27,28) which is bonded to the strip of material (1) in a glueing station (23) thereby bridging over the cap notches,
    (d) separating the sealing material in the region of the cap notches,
    (e) cutting off the plates from the strip of material,
    (f) bending each single plate to form a cylindrical cartridge wall,
    (g) inserting a film spool into the formed cartridge wall,
    (h) providing caps at the ends of said cartridge wall.

2. Process according to claim 1, characterised in that the strip of material (1) used is a strip of sheet metal which is lacquered with printed matter as required for the plates (47) which are to form the individual cartridges.

3. Process according to claim 1, characterised in that bonding of the sealing strip (27, 28) to the strip of material (1) is effected by inductive heating of the sheet metal.

4. Process according to claim 1, characterised in that the cap notches (15,16) between the plates for one or more cartridges are punched out of a strip of material (1) in the rhythm of the working stroke by means of a single or multiple tool.

5. Process according to claim 1, characterised in that before the cap notches (15,16) have been punched out of the strip material, the notches are aligned by adjustment pins in correct position.

6. Process according to claim 5, characterised in that the cap notches (15,16) produced during one punching stroke are used for alignment in the following punching stroke.

7. Process according to claim 5, characterised in that the tools for punching (11,12) and the tools for alignment (18,19) the cap notches (15,16) are provided on the same holder (9).

8. Process according to claim 1, wherein the strip of material used is a strip of sheet metal which are covered with printed matter as required for the plates which are to form the individual cartridges.

* * * * *